(12) United States Patent
Dong et al.

(10) Patent No.: US 8,400,027 B2
(45) Date of Patent: Mar. 19, 2013

(54) FLAT LINEAR VIBRATING MOTOR

(75) Inventors: Le-Ping Dong, Shenzhen (CN);
Hong-Fu Xu, Shenzhen (CN)

(73) Assignees: AAC Acoustic Technologies (Shenzhen) Co. Ltd., Shenzhen (CN);
American Audio Components Inc., La Verne, CA (US)

( * ) Notice: Subject to any disclaimer, the term of this patent is extended or adjusted under 35 U.S.C. 154(b) by 400 days.

(21) Appl. No.: 12/697,248

(22) Filed: Jan. 30, 2010

(65) Prior Publication Data

US 2011/0089772 A1     Apr. 21, 2011

(30) Foreign Application Priority Data

Oct. 19, 2009   (CN) .................... 2009 2 0206052 U

(51) Int. Cl.
*H02K 33/00* (2006.01)
(52) U.S. Cl. .......................................... 310/25; 310/81
(58) Field of Classification Search ............... 310/15, 310/20, 25–30, 36, 81, 12.25, 12.26, 12.31, 310/37
See application file for complete search history.

(56) References Cited

U.S. PATENT DOCUMENTS

| | | | | |
|---|---|---|---|---|
| 5,732,064 A * | 3/1998 | Huang | | 720/611 |
| 7,245,049 B2 * | 7/2007 | Aihara | | 310/15 |
| 7,453,178 B2 * | 11/2008 | Chang | | 310/81 |
| 7,671,493 B2 * | 3/2010 | Takashima et al. | | 310/15 |
| 7,960,875 B2 * | 6/2011 | Higuchi | | 310/15 |
| 2002/0017824 A1 * | 2/2002 | Sakai | | 310/81 |
| 2003/0227225 A1 * | 12/2003 | Kaneda et al. | | 310/81 |
| 2004/0150277 A1 * | 8/2004 | Moriyasu | | 310/81 |
| 2006/0006750 A1 * | 1/2006 | Segawa | | 310/71 |
| 2006/0022781 A1 * | 2/2006 | Kim | | 335/296 |
| 2006/0284501 A1 * | 12/2006 | Takagi et al. | | 310/81 |
| 2009/0096299 A1 * | 4/2009 | Ota et al. | | 310/25 |

* cited by examiner

*Primary Examiner* — John K Kim
*Assistant Examiner* — Naishadh Desai

(57) ABSTRACT

A flat linear vibrating motor includes a cover, a base forming a receiving cavity together with the cover, a coil fixed on the base, an elastic member coupled to the base, a vibrator suspended in the cavity by the elastic member. The elastic member includes a mounting section coupled to the base, an arm extending from the mounting section, a free end extending from the arm, and a binder. The binder includes two plates for clamping the vibrator and a coupling section coupling the two plates for positioning the free end between the vibrator and the coupling section.

10 Claims, 4 Drawing Sheets

FLAT LINEAR VIBRATING MOTOR

FIELD OF THE INVENTION

The present invention generally relates to the art of vibrating motors, more particularly to a flat linear vibrating motor.

BACKGROUND OF THE INVENTION

Flat linear vibrating motors are widely used in portable electronic products, such as mobile phones, for providing tactile vibration.

Generally, the flat linear vibrating motor comprises a cover, a base forming a receiving cavity together with the cover, a coil located on the base, an elastic member coupled to the base, a vibrating unit suspended in the receiving cavity by the elastic member. The vibrating unit typically includes a magnet and a weight attached to the magnet. The coil is positioned right below the magnet.

The elastic member comprises an arm and a pair of splints extending from the arm, and the splints attach to the vibrating unit for suspend the vibrating unit in the cavity. As the arm and the splints are integrated formed with complex structures, it is not convenient to manufacture such an elastic member. And, during the vibration of the vibrating unit, the arm will be given great stresses, which shorten the circle life of the elastic member.

So, it is necessary to provide an improved flat linear vibrating motor for solving the problems mentioned above.

SUMMARY OF THE INVENTION

In one exemplary embodiment of the present invention, a flat linear vibrating motor comprises a cover, a base forming a receiving cavity together with the cover, a coil fixed on the base, an elastic member, and a vibrator suspended in the cavity by the elastic member. The elastic member comprises a mounting section coupled to one of the base and the cover, an arm extending from the mounting section, a free end extending from the arm, and a binder including two plates for clamping the vibrator and a coupling section coupling the two plates for positioning the free end between the vibrator and the coupling section.

Other features and advantages of the present invention will become more apparent to those skilled in the art upon examination of the following drawings and detailed description of the exemplary embodiment.

DETAILED DESCRIPTION OF THE PREFERRED EMBODIMENT

Reference will now be made to describe one embodiment of the present invention in detail.

Figure 1:
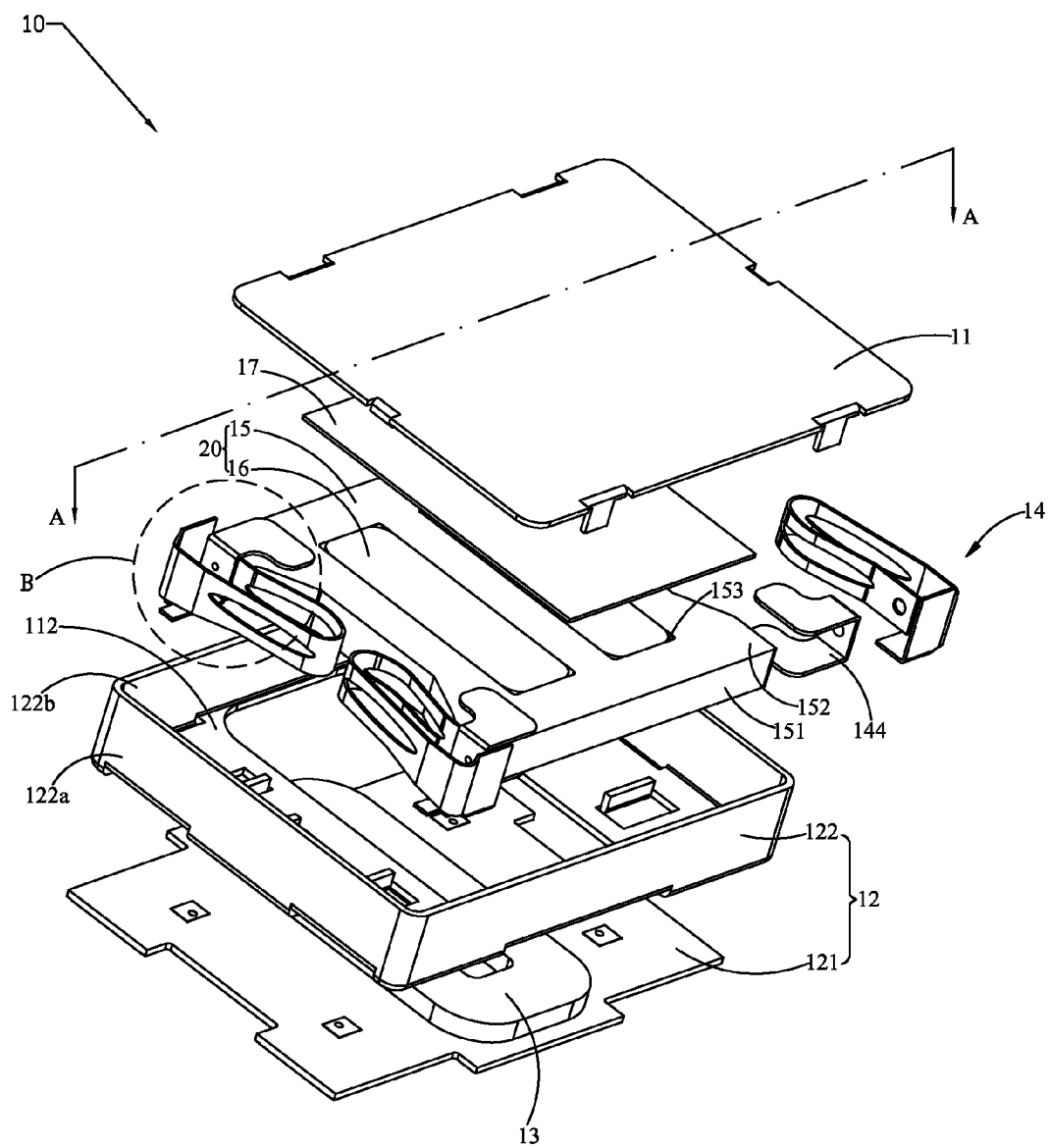
FIG. 1 depicts an exploded view of a flat linear vibrating motor in accordance with one embodiment of the present invention.
Figure 2:
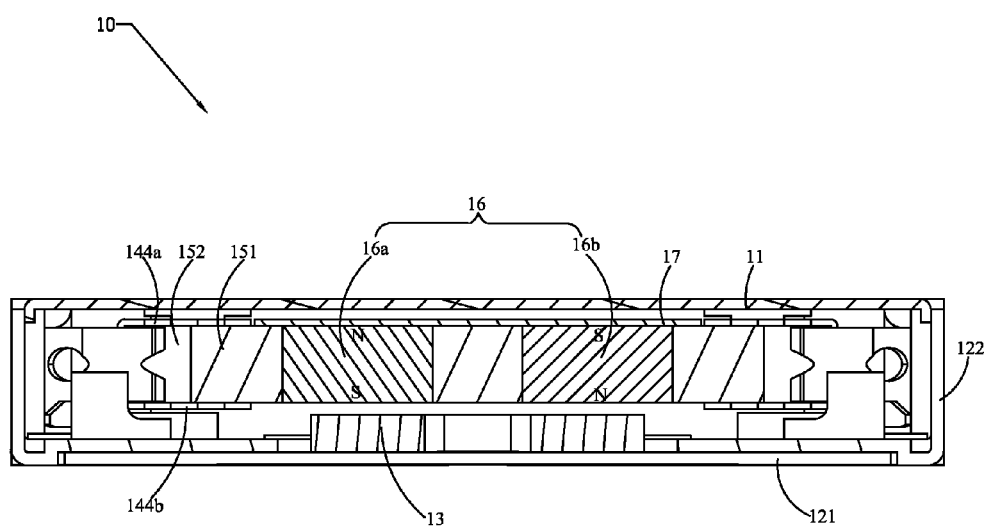
FIG. 2 illustrates a cross-sectional view of the flat linear vibrating motor taken along Line A-A in FIG. 1.

Referring to FIG. 1 and FIG. 2, a flat linear vibrating motor 10, in accordance with one exemplary embodiment of the present invention, includes a cover 11, a base 12 forming a receiving cavity 112 together with the cover 11, a coil 13 positioned on the base 12, an elastic member 14, a vibrator 20 suspended by the elastic member 14 in the receiving cavity 112, and a plate 17 located on the vibrator 20. The vibrator 20 comprises a weight 15 and a magnet assembly 16.

The base 12 includes a bottom 121 and a plurality of sides 122 extending from the bottom 121, the coil 13 is fixed on the bottom 121. The weight 15 includes a body 151, a plurality of protrusions 152 extending from the body 15 for coupling the elastic member 14, and at least one hole 153 for receiving the magnet assembly 16. While assembled, one end of the elastic member 14 connects to the protrusion 152, and the other end of the elastic member 14 fixed to the base 12. Accordingly, the vibrator 20 is suspended by the elastic member 14 in the receiving cavity 112. In this embodiment, the magnet assembly 16 includes a first magnet 16a and a second magnet 16b respectively received in two holes 153. Polarization directions of the two magnets are opposite to each other, as shown in FIG. 2.

The coil 13 is located right below the magnet assembly 16, and a gap is provided between the coil 13 and the magnet assembly 16. Magnetic pole of the magnet assembly faces the coil.

Figure 3:
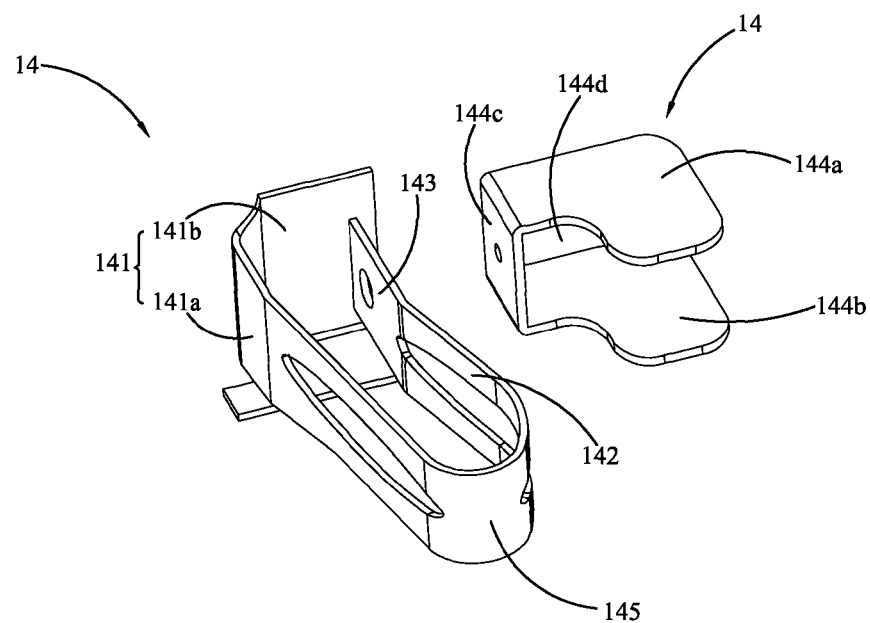
FIG. 3 depicts an exploded view of an elastic member of the flat linear vibrating motor.
Figure 4:
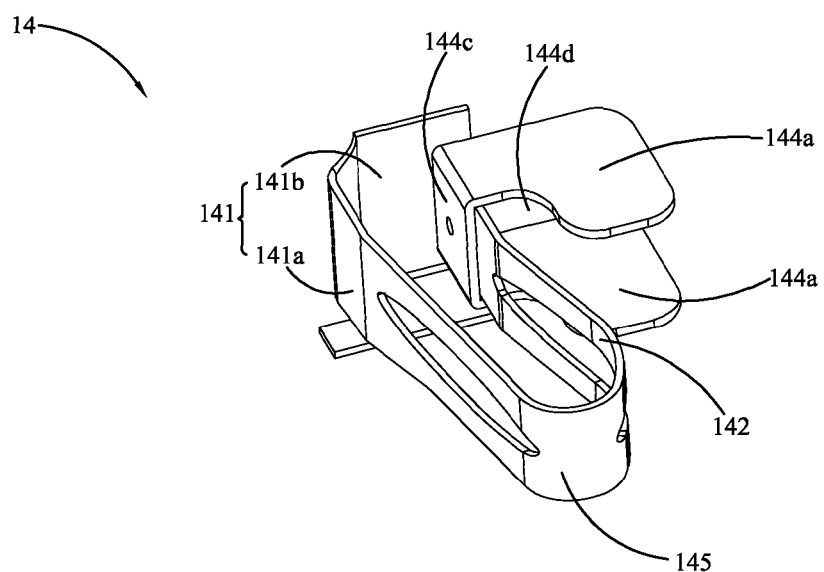
FIG. 4 depicts an assembled view of the elastic member.

Referring FIG. 3 and FIG. 4, together with FIG. 2, the elastic member 14 comprises a mounting section 141 coupled to the side 122 of the base 12, an arm 142 extending from the mounting section, a free end 143 extending from the arm 142, and a binder 144 coupled to the free end 143. The arm 142 is connected to the mounting section 141 by a U-shaped connecting part 145. The arm 142 is elastically deformable along a direction parallel to the bottom 121 of the base 12.

The mounting section 141 includes a first part 141a coupled to one side 122 of the base 12, and a second part 141b extending from the first part 141a and coupled to one adjacent side 122 of the base 12. For example, in FIG. 1, the first part 141a is coupled to the side 122a, and the second part 141b is coupled to the side 122b.

Figure 5:
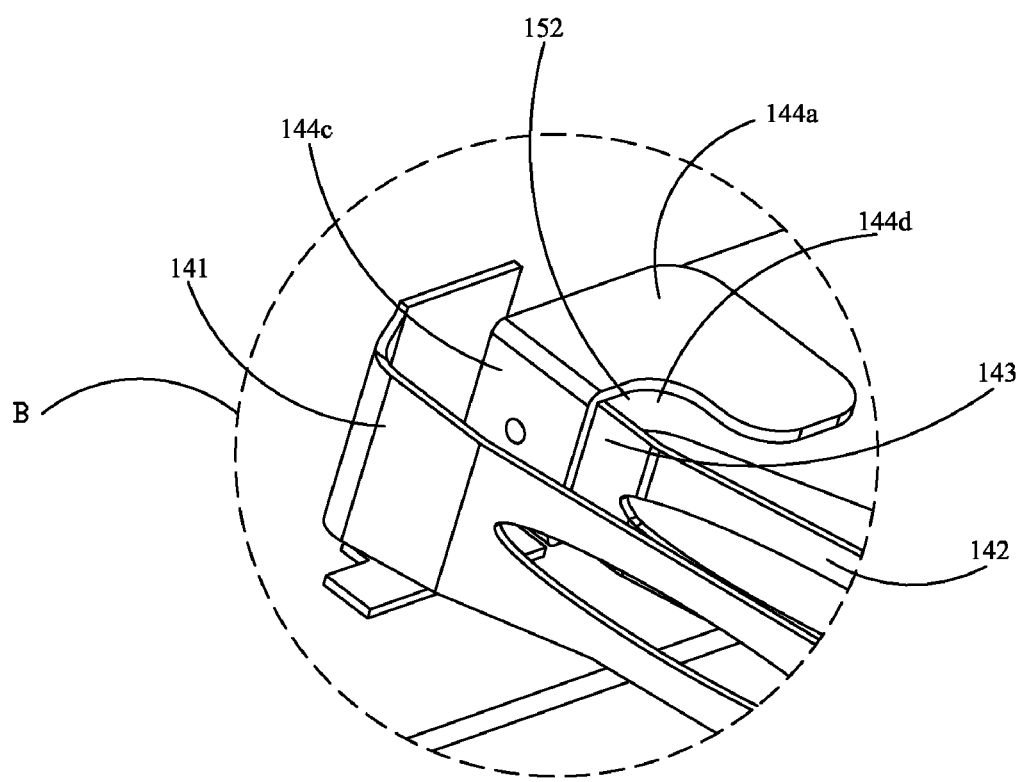
FIG. 5 depicts an enlarging view of Area B in FIG. 1.

The binder 144 includes a first plate 144a, a second plate 144b parallel to the first plate 144a, and a coupling section 144c for connecting the first plate and the second plate. A slot 144d is formed by the first part 144a, the second part 144b and the coupling section 144c. Referring to FIGS. 1 and 5, while assembled with the vibrator 20, the coupling section 144c is attached to the free end 143 with the free end 143 received in the slot 144d, and the free end 143 is attached to the an outer surface of the protrusion 152 of the weight 15. Thus, the free end 143 is positioned between the coupling section 144c and the outer surface of the protrusion 152 of the weight 15. Meanwhile, the two plates 144a, 144b attach to an upper surface and a lower surface of the protrusion 152, respectively. Therefore, the protrusion 152 is firmly clamped by the binder 144. Accordingly, the vibrator 20 is firmly assembled to the elastic member 14.

When the coil 13 is electrified, the vibrator 20 is forced to move along a direction parallel to the base 12 by the electromagnetic force, i.e., the Lorentz force.

According to contents mentioned above, it is convenient to manufacture the elastic member, and, as the free end is located between the protrusion of the weight and the coupling section of the binder, stress therein is reduced. Accordingly, circle life of the elastic member is extended.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A flat linear vibrating motor, comprising:
a cover;
a base forming a receiving cavity together with the cover;
a coil fixed on the base;
an elastic member comprising a mounting section coupled to one of the base and the cover, an arm extending from the mounting section, and a free end extending from the arm;
a vibrator suspended in the cavity by the elastic member for vibrating along a direction parallel to the base; wherein
the elastic member further comprises a binder including two plates for clamping the vibrator and a coupling section coupling the two plates for positioning the free end between the vibrator and the coupling section.

2. The flat linear vibrating motor as described in claim 1 comprising a magnet assembly and a weight coupled to the binder.

3. The flat linear vibrating motor as described in claim 2, wherein the coil is located right below the magnet assembly.

4. The flat linear vibrating motor as described in claim 1, wherein the arm connects to the mounting section by a U-shaped connecting part.

5. The flat linear vibrating motor as described in claim 1 comprising a plate between the cover and the vibrator.

6. A flat linear vibrating motor, comprising:
a cover;
a base forming a receiving cavity together with the cover;
a coil fixed on the base;
an elastic member comprising a mounting section coupled to one of the base and the cover, an arm extending from the mounting section, and a free end extending from the arm;
a vibrator suspended in the cavity by the elastic member for vibrating along a direction parallel to the base; wherein
the elastic member further comprises a binder including two plates for clamping the vibrator and a coupling section connecting the two plates, the coupling section overlapping the free end for pressing the free end on the vibrator.

7. The flat linear vibrating motor as described in claim 6 comprising a magnet assembly and a weight coupled to the binder.

8. The flat linear vibrating motor as described in claim 7, wherein the coil is located right below the magnet assembly.

9. The flat linear vibrating motor as described in claim 6, wherein the arm connects to the mounting section by a U-shaped connecting part.

10. The flat linear vibrating motor as described in claim 6 comprising a plate between the cover and the vibrator.

* * * * *